United States Patent
Kutz et al.

(10) Patent No.: US 6,981,090 B1
(45) Date of Patent: Dec. 27, 2005

(54) MULTIPLE USE OF MICROCONTROLLER PAD

(75) Inventors: Harold Kutz, Snoqualmie, WA (US); Monte Mar, Issaquah, WA (US); Warren Snyder, Snohomish, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 424 days.

(21) Appl. No.: 09/893,050

(22) Filed: Jun. 26, 2001

Related U.S. Application Data

(60) Provisional application No. 60/243,708, filed on Oct. 26, 2000.

(51) Int. Cl.[7] ............................................. G06F 13/00
(52) U.S. Cl. .................. 710/317; 710/316; 326/38; 326/41; 257/666; 257/676; 257/E23.01; 257/E23.03; 257/E23.07
(58) Field of Search ................................ 710/317, 316, 710/8, 104; 257/666, 676, E23.011, E23.032, 257/E23.079; 326/38, 41; 713/100; 340/825; 712/247

(56) References Cited

U.S. PATENT DOCUMENTS

| | | | |
|---|---|---|---|
| 5,107,146 A * | 4/1992 | El-Ayat | 326/41 |
| 5,161,124 A * | 11/1992 | Love | 365/222 |
| 5,202,687 A | 4/1993 | Distinti | 341/158 |
| 5,305,312 A * | 4/1994 | Fornek et al. | 370/264 |
| 5,414,380 A * | 5/1995 | Floyd et al. | 327/198 |
| 5,555,452 A * | 9/1996 | Callaway et al. | 455/226.2 |
| 5,563,526 A * | 10/1996 | Hastings et al. | 326/37 |
| 5,563,529 A * | 10/1996 | Seltzer et al. | 326/39 |
| 5,677,691 A * | 10/1997 | Hosticka et al. | 341/155 |
| 5,680,070 A * | 10/1997 | Anderson et al. | 327/336 |
| 5,686,844 A * | 11/1997 | Hull et al. | 326/38 |
| 5,724,009 A * | 3/1998 | Collins et al. | 331/108 C |
| 5,727,170 A * | 3/1998 | Mitchell et al. | 710/105 |
| 5,734,334 A * | 3/1998 | Hsieh et al. | 340/2.2 |
| 5,790,957 A * | 8/1998 | Heidari | 455/553.1 |
| 5,869,979 A * | 2/1999 | Bocchino | 326/38 |
| 6,057,705 A * | 5/2000 | Wojewoda et al. | 326/38 |
| 6,112,264 A * | 8/2000 | Beasley et al. | 710/38 |
| 6,144,327 A | 11/2000 | Distinti et al. | 341/126 |
| 6,167,559 A * | 12/2000 | Furtek et al. | 716/16 |
| 6,188,241 B1 * | 2/2001 | Gauthier et al. | 326/41 |
| 6,192,431 B1 * | 2/2001 | Dabral et al. | 710/62 |
| RE37,195 E * | 5/2001 | Kean | 326/39 |
| 6,246,258 B1 * | 6/2001 | Lesea | 326/39 |
| 6,337,579 B1 * | 1/2002 | Mochida | 326/41 |
| 6,355,980 B1 * | 3/2002 | Callahan | 257/734 |
| 6,356,958 B1 * | 3/2002 | Lin | 710/1 |
| 6,492,834 B1 * | 12/2002 | Lytle et al. | 326/41 |
| 6,507,215 B1 * | 1/2003 | Piasecki et al. | 326/41 |

(Continued)

OTHER PUBLICATIONS

Morrison, Gale, "IBM Eyes Merchant Packaging Services," Jul. 13, 1998, Electronic News, available at http://www.findarticles.com.*

(Continued)

*Primary Examiner*—Glenn A. Auve
*Assistant Examiner*—Donna K. Mason
(74) *Attorney, Agent, or Firm*—Wagner, Murabito & Hao LLP

(57) ABSTRACT

A circuit arrangement permits a microcontroller wirebond pad to be configured to be an analog or digital input or output. The circuit arrangement uses any of a plurality of switching configurations to selectively determine the use of the wirebond pad under control of the microcontroller's processor. The microcontroller can be configured using configurable analog and configurable digital blocks to perform any of a plurality of functions with certain of the pinouts determined under program control.

19 Claims, 6 Drawing Sheets

U.S. PATENT DOCUMENTS

| | | | |
|---|---|---|---|
| 6,509,758 B2 * | 1/2003 | Piasecki et al. | 326/37 |
| 6,614,260 B1 * | 9/2003 | Welch et al. | 326/41 |
| 6,738,858 B1 * | 5/2004 | Fernald et al. | 710/317 |
| 6,768,337 B2 * | 7/2004 | Kohno et al. | 326/41 |
| 2001/0043081 A1 * | 11/2001 | Rees | 326/38 |
| 2002/0121679 A1 * | 9/2002 | Bazarjani et al. | 257/666 |
| 2004/0054821 A1 * | 3/2004 | Warren et al. | 710/8 |

OTHER PUBLICATIONS

Charles, Jr., H.K., et al., "Wirebonding: Reinventing the Process from MCMs," Apr. 15-17, 1998, IEEE 7th International Conference on Multichip Modules and High Density Packaging, p. 300-302.*

Tran, T.A., et al., "Fine Pitch and Wirebonding and Reliability of Aluminum Capped Copper Bond Pads," May 21-24, 2000, IEE Electronic Components and Technology Conference, p. 1674-1680.*

CYPR-CD00187; "A Configurable Input/Output Interface for a Microcontroller"; Sep. 14, 2001; U.S Appl. No. 09/953,423; Kutz et al.

* cited by examiner

MULTIPLE USE OF MICROCONTROLLER PAD

CROSS REFERENCE TO RELATED DOCUMENTS

This application is related to and claims priority benefit under 35 U.S.C. 119(e) of U.S. Provisional patent Application Ser. No. 60/243,708, filed Oct. 26, 2000 to Snyder, et al. which is hereby incorporated herein by reference. This application is also related to U.S. patent application Ser. No. 09/893,048, filed Jun. 26, 2001 to Kutz, et al. entitled "Multiple Use of Microcontroller Pad", which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of integrated circuits. More particularly, this invention relates to an arrangement for multiple use of wirebond pads on a microcontroller die.

BACKGROUND OF THE INVENTION

The size of an integrated circuit die required is often constrained by the number of wirebonding pads needed to provide a given function. When a large number of pinouts are required to support a particular functionality, the corresponding large number of wirebond pads can dictate the size of an integrated circuit die. Since the size of the die is directly related to the production cost and throughput of a particular circuit, it is desirable to minimize the size required for each circuit. In the case of a microcontroller, this factor can become extremely important since it is desirable to provide a maximum level of versatility in any given device to increase its marketplace acceptance and thus volumes of the device produced.

SUMMARY OF THE INVENTION

The present invention relates generally to integrated circuits. Objects, advantages and features of the invention will become apparent to those skilled in the art upon consideration of the following detailed description of the invention.

In one embodiment consistent with the present invention, a circuit arrangement permits a microcontroller wirebond pad to be configured to be an analog or digital input or output. The circuit arrangement uses any of a plurality of switching configurations to selectively determine the use of the wirebond pad under control of the microcontroller's processor. The microcontroller can be configured using configurable analog and configurable digital blocks to perform any of a plurality of functions with certain of the pinouts determined under program control. This provides an advantage of being able to use the wirebond pad for multiple purposes and frees a design of the constraint of providing all possible pinout configurations for all analog and digital configurations.

In an embodiment consistent with the invention, a microcontroller has a configurable analog circuit block and a configurable digital circuit block. A wirebond pad and a processor are provided. A switching circuit selectively connects the configurable analog circuit block and the digital circuit block to the wirebond pad under control of the processor.

In another embodiment, a microcontroller, consistent with the invention, has a circuit including at least one of an analog circuit and a digital circuit. A wirebond pad and a processor are arranged so that a switching circuit selectively connects the circuit to the wirebond pad under control of the processor.

In certain preferred embodiments, the configurable analog circuit block has an analog input and an analog output and the configurable digital circuit block has a digital input and a digital output. The switching circuit selectively connects one of the analog input, the analog output, the digital input and the digital output to the wirebond pad under control of the processor. Various switching circuits including tristate analog and digital circuits, analog switches and logic gates (for example) can be used to effect the switching.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
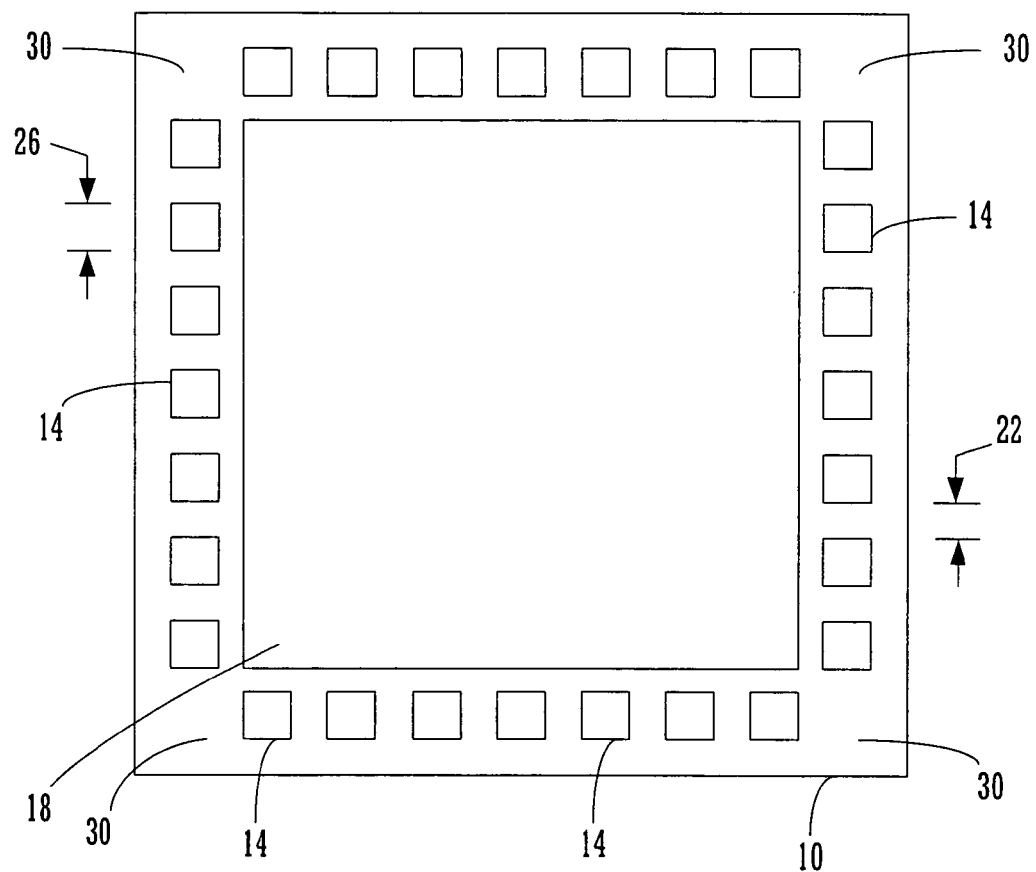
FIG. 1 is an exemplary layout of an integrated circuit die.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Turning now to FIG. 1, an integrated circuit die 10 is illustrated. Die 10 includes a plurality of wirebonding pads 14 (which are typically used for providing a wirebond or soldered electrical connection to the integrated circuit 18) situated around a periphery of the die 10. The pads 14 are separated by a separation distance 22 defined generally by the resolution of the circuit's manufacturing process and the circuit layout. Pads 14 are shown symmetrically disposed around the periphery in this illustration, but this is not generally a requirement. The pads 14 are also generally of a particular geometry, generally square with a minimum size 26 as shown, but other shapes are also used.

Figure 2:
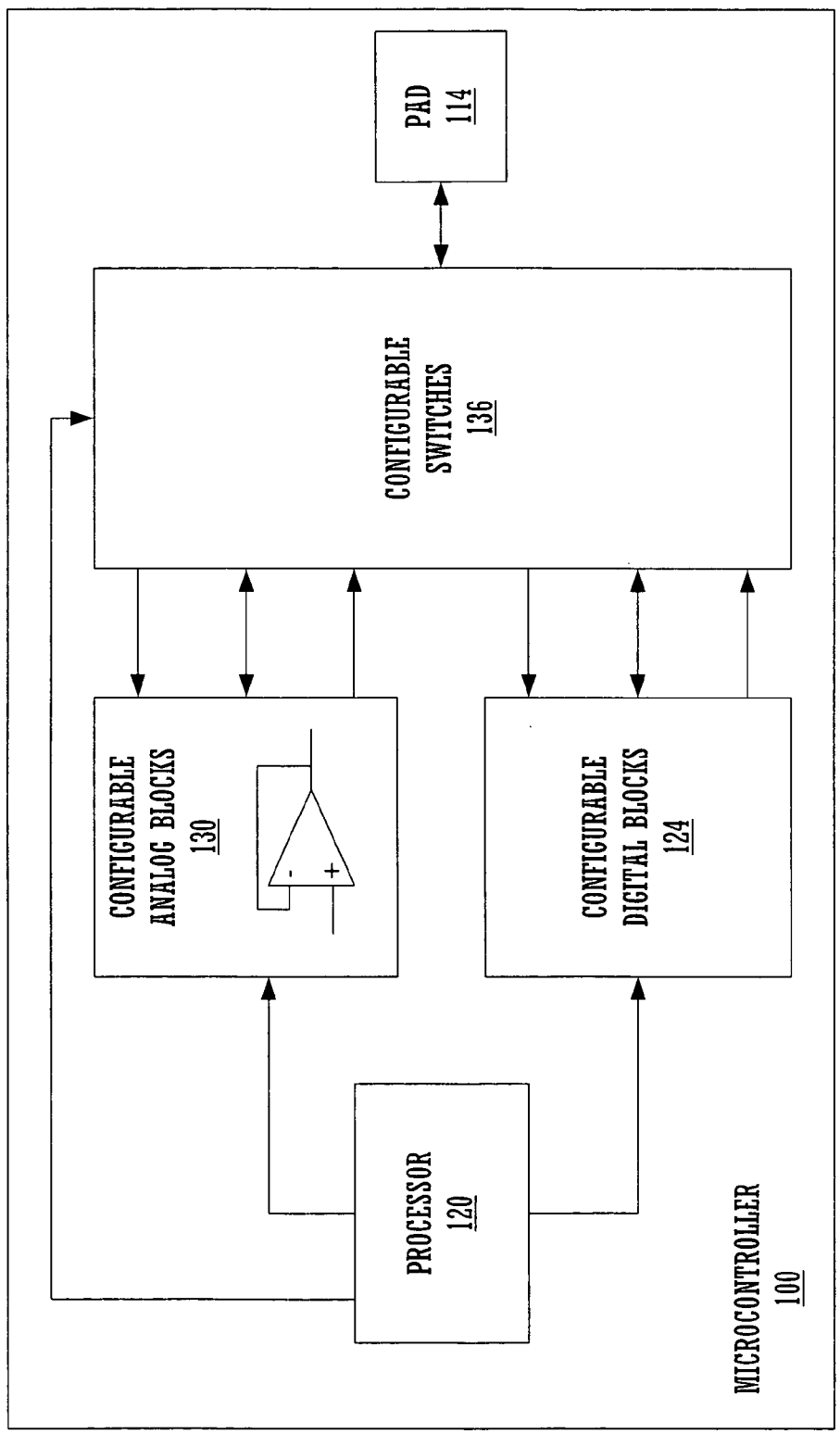
FIG. 2 is an overall block diagram of a microcontroller consistent with an exemplary embodiment of the present invention.

In the classic manufacturing process, an array of such dice are produced on a wafer of silicon. The dies are then separated from one another by cutting or breaking at a scribe line. During this process, the corner areas 30 of the die have historically been exposed to substantial amounts of mechanical stress and may fracture or break in the separation process. However, gradual improvements in the technology of separation of the dies has substantially lessened the stress and incidence of fractures in this region. In order to maximize the versatility of the circuit arrangement of the present invention, a microcontroller 100 as illustrated in FIG. 2 utilizes one or more multi-purpose pads 114. Microcontroller 100 includes a processor 120 that can be programmed for a specified purpose by or for a user. A plurality of digital circuits are provided to form configurable digital blocks 124. These configurable digital blocks 124 can include gates, counters, buffers, latches, decoders, encoders, registers, flip-flops, timers, etc. that can be user configured in any suitable arrangement to implement a user's desired circuit configuration. Similarly, a plurality of analog circuits are provided to form configurable analog blocks 130. These configurable analog blocks may include filters, amplifiers, switches, clippers, limiters, summers, buffers, etc. that can be interconnected in a suitable arrangement to implement the user's desired circuit configuration.

The inputs and outputs for the configurable digital blocks 124 and configurable analog blocks 130 are coupled to a plurality of configurable switches 136 to be routed to the multi-purpose pad 114. These switches are programmed by the user or at manufacture through the processor 120 and can be arranged in a number of ways to provide multiple use of the pad 114 to provide a unidirectional or bi-directional signal path as illustrated. The switching arrangement illustrated in FIG. 2 is somewhat conceptual and can be implemented in any number of ways as illustrated in FIGS. 3–6 as well as other implementations that will occur to those skilled in the art.

Figure 3:
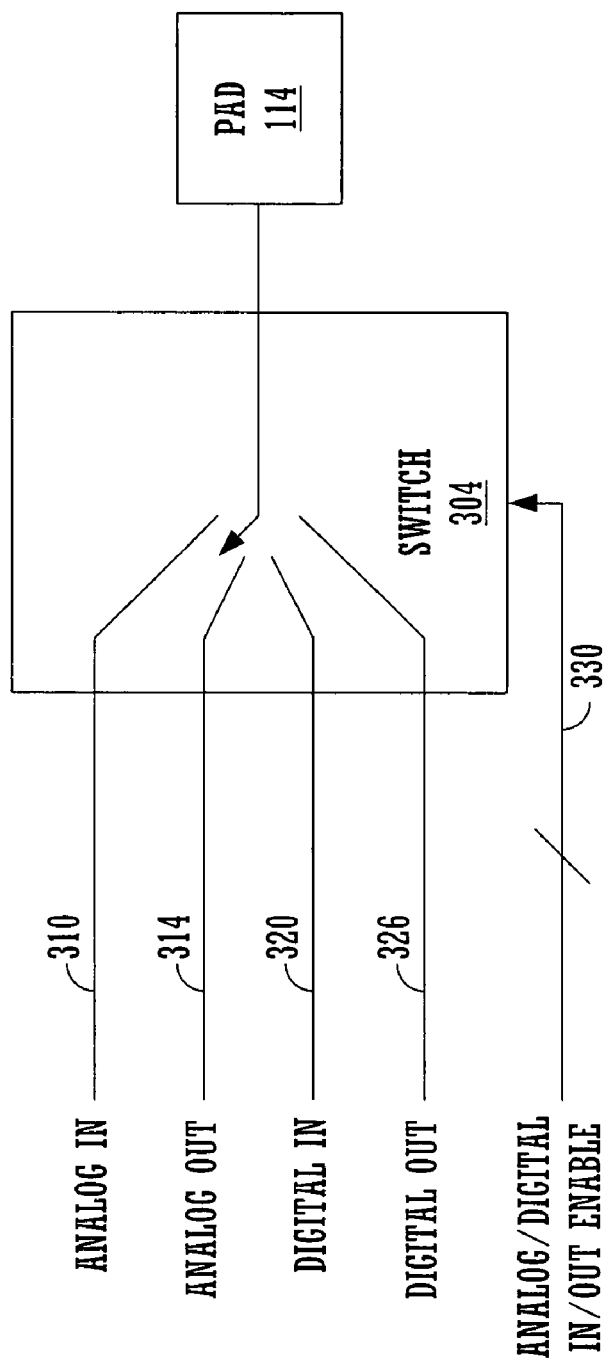
FIG. 3 illustrates a first switching arrangement for configuring a wirebond pad consistent with an embodiment of the invention.

FIG. 3 illustrates a first circuit arrangement that can be utilized to implement the switching function of configurable switches 136. In this embodiment, an electronic switch circuit 304 can be used. Switch circuit 304 can be realized with, for example, a plurality of CMOS analog switches with one side of each switch connected together at a common junction. Switch 304 is connected to an analog input 310, an analog output 314, a digital input 320 and a digital output 326—any of which can be connected to pad 114 depending upon the switch position. The switch position can be determined by a control bus 330 that serves to enable one of the desired connections (e.g., by selectively turning on one of the CMOS analog switches) and thus complete the circuit to pad 114. The switch can be configured under the control of the processor 120 as either analog or digital, input or output.

Figure 4:
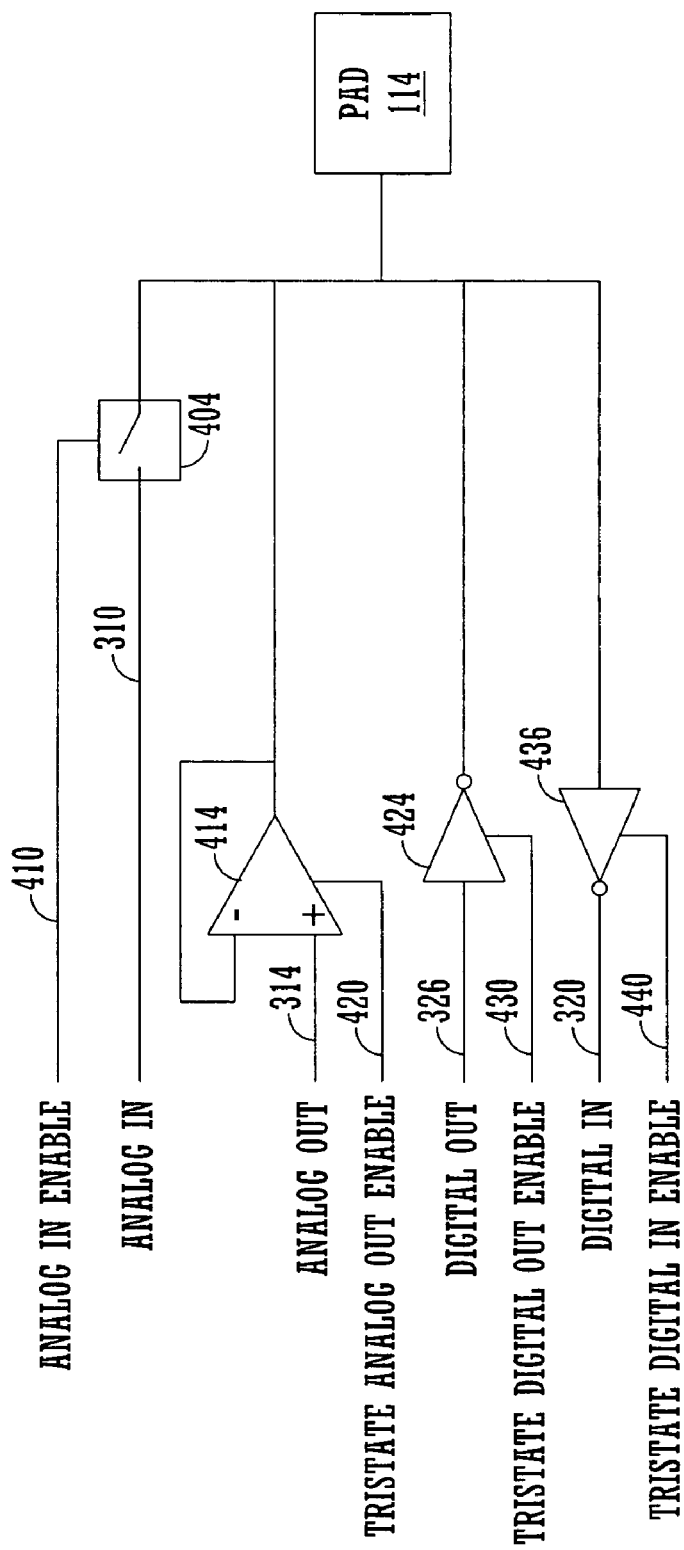
FIG. 4 illustrates a second switching arrangement for configuring a wirebond pad consistent with an embodiment of the invention.

In another embodiment illustrated in FIG. 4, an analog input (to the microcontroller through pad 114) can be selectively switched to 310 using an analog switch 404 operating under control of an analog in enable control line 410 that turns switch 404 on or off as desired to implement a connection to pad 114. An analog output from the microcontroller 100 can be selectively provided using tristate buffer amplifier 414. The analog out signal at 314 to be supplied to pad 114 is supplied to the non-inverting input of a voltage follower configured operational amplifier. The amplifier can be selectively enabled using tristate control at a tristate analog out enable line 420. Tristate control can similarly be used to control digital out signal 326 through a tristate inverter 424. The output of the tristate inverter 424 is connected to pad 114 and it can be effectively removed from the circuit or switched on using tristate control applied by tristate digital out enable signal 430 to control whether or not the inverter is enabled or "tri-stated". Tristate control can similarly be used to control digital in signal 320 through a tristate inverter 436. The high impedance input of the tristate inverter 436 is connected to pad 114 and it can be effectively removed from the circuit or switched on using tristate control applied by tristate digital in enable signal 440 to control whether or not the inverter is enabled or disabled (tri-stated). In this embodiment, the pad 114 is isolated from the circuitry within the microcontroller by the high impedance of a tristate controlled gate or an analog switch in the off position to thus prevent unnecessary loading. Again, the switching arrangement can be configured under the control of the processor 120 as either analog or digital, input or output.

Figure 5:
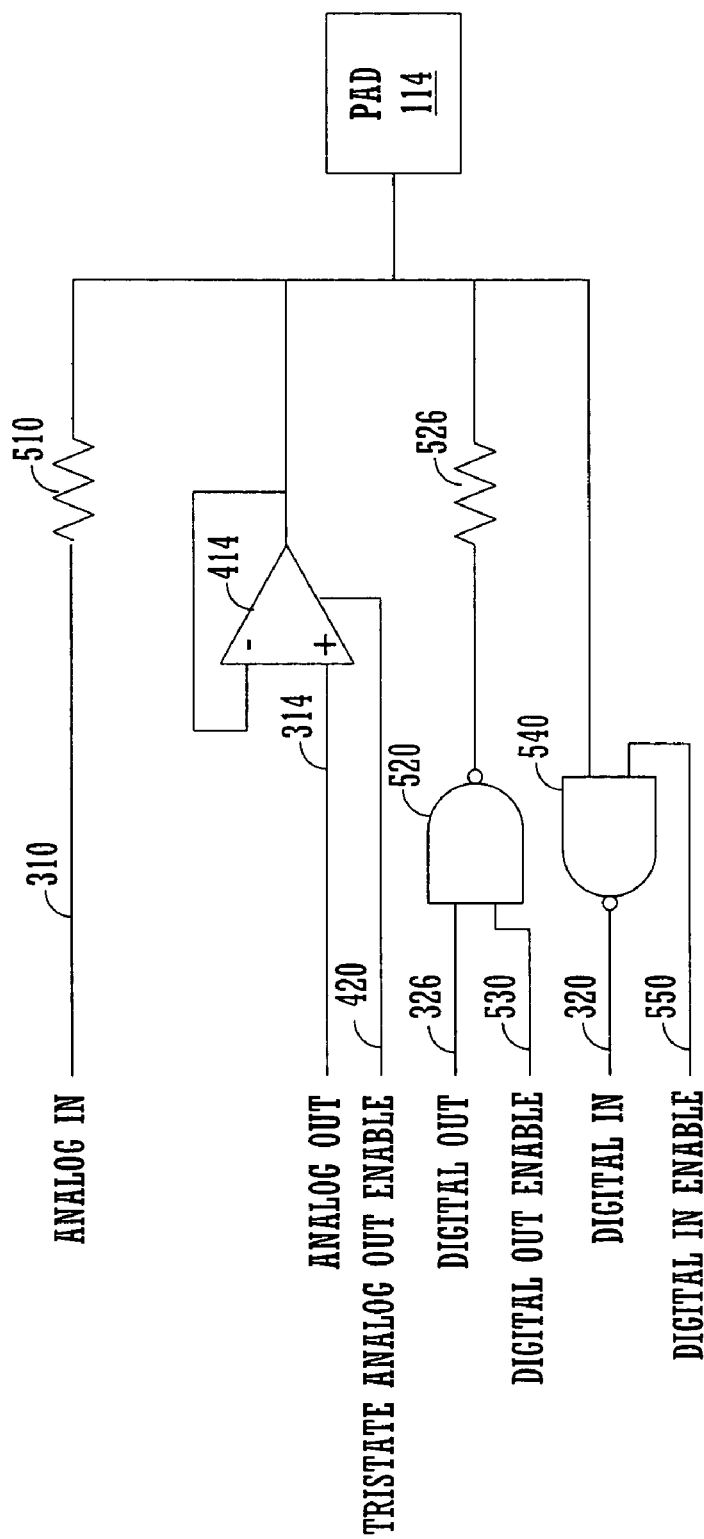
FIG. 5 illustrates a third switching arrangement for configuring a wirebond pad consistent with an embodiment of the invention.

FIG. 5 illustrates another embodiment of a switching arrangement consistent with the present invention. In this embodiment, resistors are used to provide isolation to reduce circuit complexity. An analog input signal to the microcontroller 100 passes from pad 114 through an isolation resistor 510 to provide the input at node 310. If the input is not being used as an analog input, the signal at 310 is simply ignored by the microcontroller 100 or not connected to a functioning configurable analog circuit block 130. As in the example of FIG. 5, an analog output from the microcontroller 100 can be selectively provided using tristate buffer amplifier 414. The analog out signal 314 to be supplied to pad 114 is supplied to the non-inverting input of a voltage follower configured operational amplifier. The amplifier can be selectively enabled using tristate control at a tristate analog out enable line 420.

In this embodiment, digital NAND gates are used for switches in the digital signal paths. Other digital gates such as AND gates could also be used. NAND gate 520 is used to gate a signal from digital out 326 to pad 114 through an isolation resistor 526. The pad 114 is configured as a digital output by use of a digital signal applied to digital out enable 530 to either pass or reject digital signals at node 326. A logic zero at 530 effectively forces the output of NAND gate 520 to a logic high state at all times to effectively turn off the gate. Resistor 526 isolates this high state from the pad 114. Other isolation resistor arrangements could also be used. In a similar manner, NAND gate 540 is used to gate a signal from pad 114 to digital in 320 through an isolation resistor (not shown). The pad 114 is configured as a digital input by use of a digital signal applied to digital in enable 550 to either pass or reject digital signals at pad 114. A logic zero at 550 effectively forces the output of NAND gate 540 to a logic high state at all times. Again, the switching arrangement can be configured under the control of the processor 120 as either analog or digital, input or output.

Figure 6:
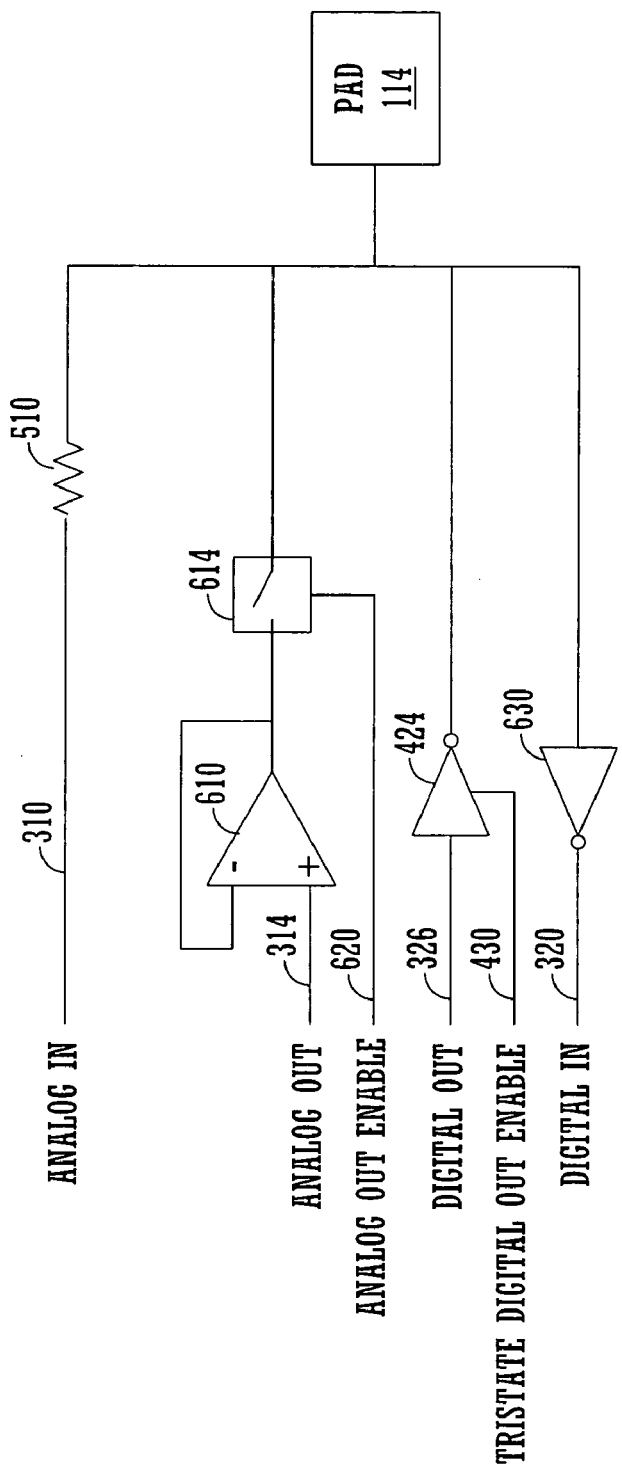
FIG. 6 illustrates a fourth switching arrangement for configuring a wirebond pad consistent with an embodiment of the invention.

Another embodiment is illustrated in FIG. 6. In this embodiment, as in FIG. 5, an analog input signal to the microcontroller 100 passes from pad 114 through an isolation resistor 510 to provide the input at node 310. If the input is not being used as an analog input, the signal at 310 is simply ignored by the microcontroller 100 or not connected to a functioning configurable analog circuit block 130. As in FIG. 4, tristate control is used to control digital out signal 326 through a tristate inverter 424. The output of the tristate inverter 424 is connected to pad 114 and it can be effectively removed from the circuit or switched on using tristate control applied by tristate digital out enable signal 430 to control whether or not the inverter is enabled or tri-stated.

Analog output signals can be passed to pad 114 by use of an analog buffer configured operational amplifier 610. The input of amplifier 610 is connected to analog out node 314 and the output is passed through an analog switch 614 to pad 114. A digital signal at 620 controls the state of switch 614 to provide an analog out enable function. Switch 614 provides isolation between the amplifier 610's output and pad 114 if the analog out function is not enabled. In another embodiment, not shown, a resistor could be used for isolation in place of switch 614 with no input being applied to the amplifier 314. Digital input signals can be accommodated by use of an inverter (or buffer) 630 with its input connected to pad 114. The inverter's output is provided as a signal at node 320. In this embodiment, the inverter has no tristate control or other switching mechanism as such and the output of inverter 630 is simply not connected to functional logic or ignored if not being used. Again, the switching arrangement can be configured under the control of the processor 120 as either analog or digital, input or output.

Other switching arrangements can also be provided without departing from the invention using switches, tristate devices, logic switches and other switching arrangements to provide selective control by the processor of the configuration of one or more pads of microcontroller to thus enhance the versatility of the device without increasing device size to accommodate numerous pinouts. Moreover, although specific combinations of switching techniques have been illustrated with each example of FIGS. 3–6, the switching techniques shown for each signal line can be used individually in any suitable combination to provide the switching most suitable to a given application, circuit manufacturing process, layout, etc. In addition, although analog inputs were only shown switched using an analog switch, a tristate amplifier buffer could also be used as in the case of analog outputs. Also, while NAND gates were used as switches, other multiple input logic gates could be used. And, although inverting tristate buffers were used as switches, non-inverting configurations could also be used. Moreover, although only a single connection (e.g., analog or digital input or output) has been described as connected to the wirebond pad under microcontroller control, multiple connections to a single pad can also be implemented within the scope of the present invention. Such variations should be considered equivalents.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A microcontroller, comprising:
a circuit comprising an analog circuit and a digital circuit wherein said analog circuit comprises a dedicated analog input and a dedicated analog output and said digital circuit comprises a dedicated digital input and a dedicated digital output;
a wirebond pad;
a processor; and
a user selectable switching circuit that selectively connects at least one of said dedicated analog input, said dedicated analog output, said dedicated digital input and said dedicated digital output to the wirebond pad under control of the processor after packaging of said circuit.

2. The microcontroller according to claim 1, wherein the analog circuit comprises a configurable analog circuit block.

3. The microcontroller according to claim 1, wherein the digital circuit comprises a configurable digital circuit block.

4. The microcontroller according to claim 1, wherein the switching circuit comprises a tristate analog buffer amplifier coupling the dedicated analog output to the wirebond pad, and wherein the dedicated analog output is switched by tristate control of the tristate analog buffer amplifier.

5. The microcontroller according to claim 1, wherein the switching circuit comprises an analog buffer amplifier in series with an analog switch coupling the dedicated analog output to the wirebond pad, and wherein the dedicated analog output is switched by the analog switch.

6. The microcontroller according to claim 1, wherein the switching circuit comprises an analog switch coupling the dedicated analog output to the wirebond pad, and wherein the dedicated analog output is switched by the analog switch.

7. The microcontroller according to claim 1, wherein the switching circuit comprises an analog switch coupling the dedicated analog input to the wirebond pad, and wherein the dedicated analog input is switched by the analog switch.

8. The microcontroller according to claim 1, wherein the switching circuit comprises a tristate analog buffer amplifier coupling the dedicated analog input to the wirebond pad, and wherein the dedicated analog input is switched by tristate control of the tristate analog buffer amplifier.

9. The microcontroller according to claim 1, wherein the switching circuit comprises a tristate logic gate coupling the dedicated digital output to the wirebond pad, and wherein the dedicated digital output is switched by tristate control of the tristate logic gate.

10. The microcontroller according to claim 9, wherein the tristate logic gate comprises an inverter.

11. The microcontroller according to claim 9, wherein the tristate logic gate comprises a buffer.

12. The microcontroller according to claim 1, wherein the switching circuit comprises a multiple input logic gate coupling the dedicated digital output to the wirebond pad, and wherein the dedicated digital output is switched by an input to the multiple input logic gate.

13. The microcontroller according to claim 12, wherein the multiple input logic gate comprises a NAND gate.

14. The microcontroller according to claim 1, wherein the switching circuit comprises a tristate logic gate coupling the dedicated digital input to the wire bond pad, and wherein the digital input is switched by tristate control of the tristate logic gate.

15. The microcontroller according to claim 14, wherein the tristate logic gate comprises an inverter.

16. The microcontroller according to claim 14, wherein the tristate logic gate comprises a buffer.

17. The microcontroller according to claim 1, wherein the switching circuit comprises a multiple input logic gate coupling the dedicated digital output to the wirebond pad, and wherein the dedicated digital output is switched by an input to the multiple input logic gate.

18. The microcontroller according to claim 17, wherein the multiple input logic gate comprises a NAND gate.

19. The microcontroller according to claim 1, wherein the switching circuit comprises an isolation resistor isolating the wirebond pad from one of a digital input, an analog input and analog output.

* * * * *